(12) United States Patent
Kurihara

(10) Patent No.: US 11,528,368 B2
(45) Date of Patent: Dec. 13, 2022

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/024,523

(22) Filed: Sep. 17, 2020

(65) Prior Publication Data

US 2021/0099585 A1 Apr. 1, 2021

(30) Foreign Application Priority Data

Sep. 30, 2019 (JP) .............................. JP2019-180375

(51) Int. Cl.
*G06F 15/00* (2006.01)
*H04N 1/00* (2006.01)
*H04N 1/32* (2006.01)

(52) U.S. Cl.
CPC ......... *H04N 1/00217* (2013.01); *H04N 1/324* (2013.01); *H04N 1/32122* (2013.01)

(58) Field of Classification Search
CPC . H04N 1/00217; H04N 1/32122; H04N 1/324
USPC ....................................................... 358/1.15
See application file for complete search history.

(56) References Cited

U.S. PATENT DOCUMENTS

| | | | | |
|---|---|---|---|---|
| 2008/0231886 A1* | 9/2008 | Wehner | ................. | G06F 3/1204 358/1.15 |
| 2012/0075672 A1* | 3/2012 | Oishi | ................. | H04N 1/00347 358/1.15 |
| 2014/0179234 A1* | 6/2014 | Lee | ......................... | H04W 4/80 455/41.2 |
| 2016/0204947 A1* | 7/2016 | Uchikawa | ............. | H04L 9/3268 713/175 |
| 2017/0277497 A1* | 9/2017 | Iwauchi | ................ | G06F 3/1236 |

FOREIGN PATENT DOCUMENTS

JP 2015-106839 A 6/2015
JP 2018-86769 A 6/2018

* cited by examiner

*Primary Examiner* — Mark R Milia
(74) *Attorney, Agent, or Firm* — Canon U.S.A., Inc. I.P. Division

(57) ABSTRACT

A method for an information processing apparatus searching for an image-processing device is provided. The method includes receiving a predetermined beacon transmitted from an image processing device, identifying an image processing device satisfying a predetermined condition based on the predetermined beacon among one or more image processing devices corresponding to the received predetermined beacon and issuing a request for a server certificate only to a identified device satisfying a predetermined condition about a position among one or more image processing devices found in a search by Bluetooth®.

10 Claims, 12 Drawing Sheets

PRINT APPLICATION HOME SCREEN

DEVICE SEARCH SCREEN
(Bluetooth Low Energy)

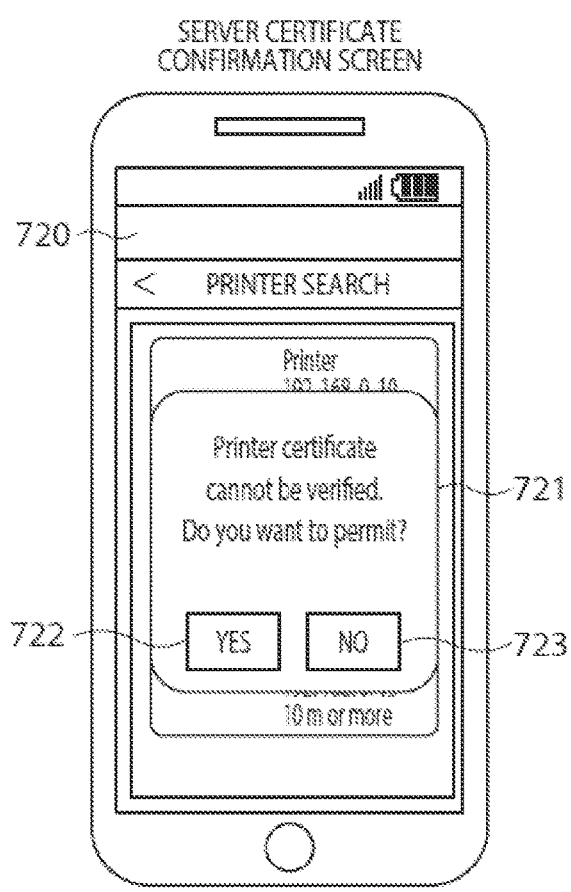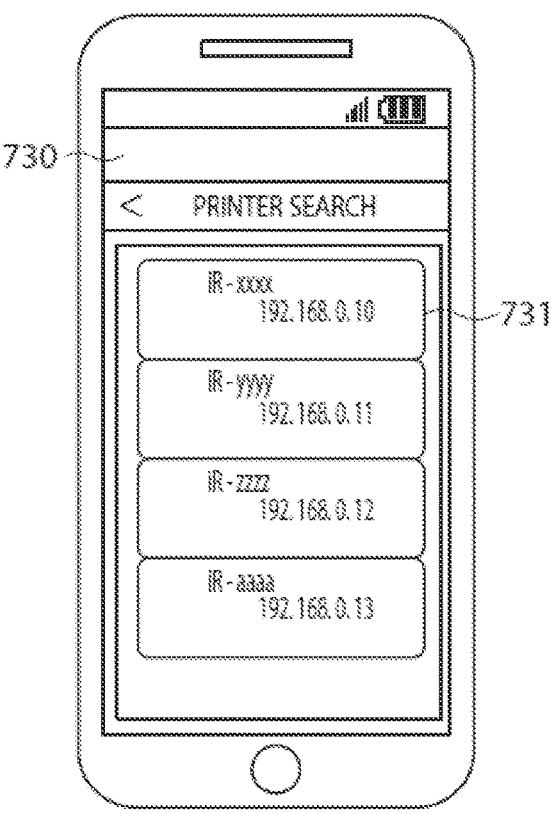

DEVICE SEARCH SCREEN (UPDATE)

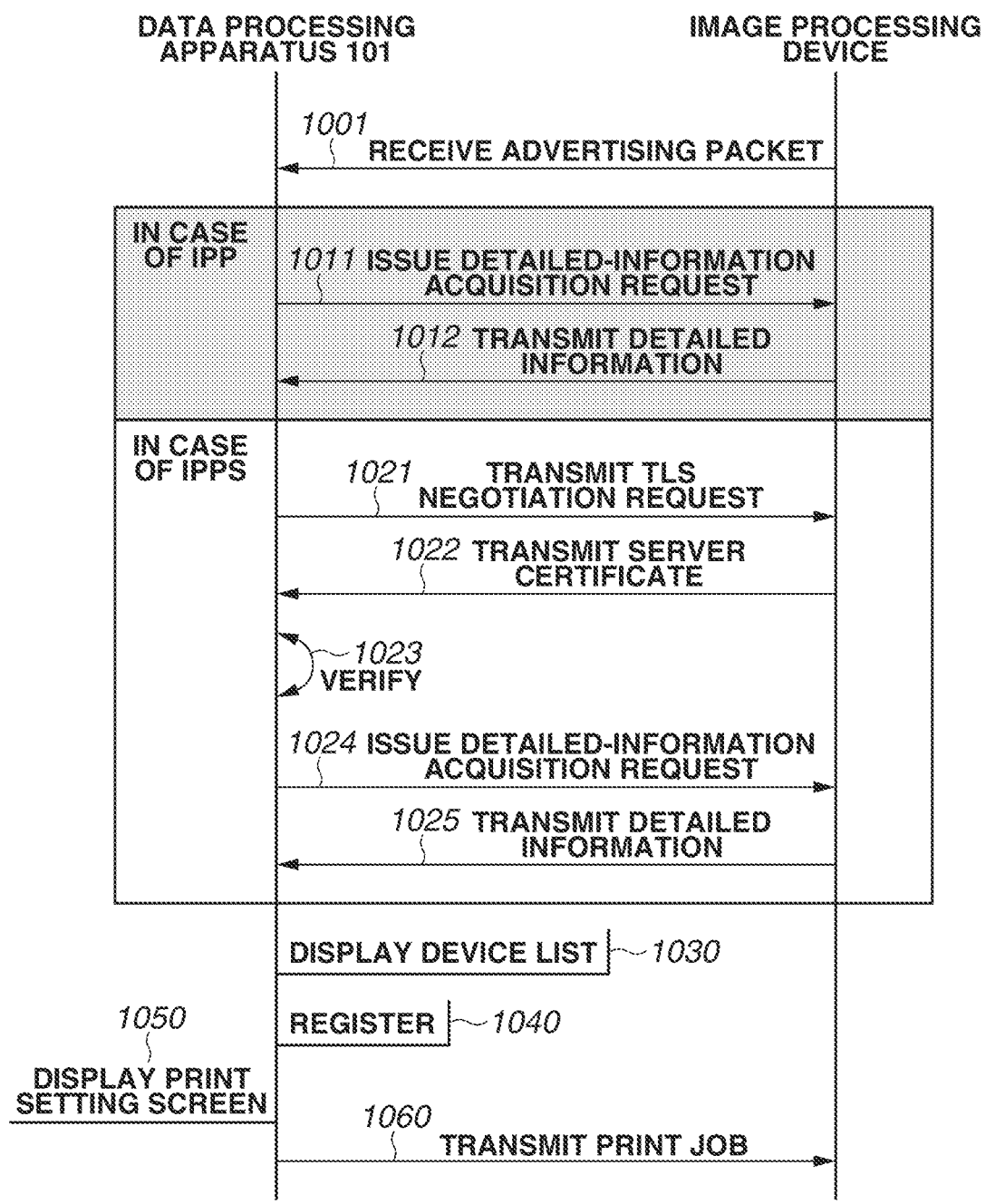

INFORMATION PROCESSING APPARATUS, STORAGE MEDIUM, AND CONTROL METHOD

BACKGROUND

Field

The present disclosure relates to a technology of searching for an image processing device and displaying the image processing device.

Description of the Related Art

In recent years, as high-performance mobile terminals called smartphones have become widespread, print applications, such as AirPrint® that provides a print function as an operating system (OS) standard function of a mobile terminal have also become prevalent.

As printer searching methods of these print applications, methods using multicast Domain Name System (multicast DNS or mDNS) and Bluetooth® are known. For example, Japanese Patent Application Laid-Open No. 2018-86769 discusses a method of searching for a printer using Bluetooth®. In a case where Bluetooth® is used, a mobile terminal searches for a printer while receiving a beacon of Bluetooth® from printers in a communication range of Bluetooth® to find printers around the mobile terminal. The received beacon includes Internet Protocol (IP) information of the printer, so that Internet Printing Protocol (IPP) communication or IPP secure version (IPPS) communication is performed using the obtained IP information. Detailed information such as the printer name is acquired from the printer in the IPP or IPPS communication, and the acquired information for each of the printers found in the search is displayed in a list of a search result on a screen. In a case where the printer supports Transport Layer Security (TLS), the detailed information is acquired in the IPPS communication.

To perform the IPPS communication, the mobile terminal requests the printer to provide a server certificate before performing the IPPS communication. If the mobile terminal can successfully verify the reliability of the server certificate, the mobile terminal starts communication with the printer regarded as a reliable printer, and displays the information of the printer on the screen for the search result. In a case where the mobile terminal determines that the printer is not reliable in verifying the reliability of the server certificate, a warning is displayed as discussed in Japanese Patent Application Laid-Open No. 2015-106839, and processing such as inquiring of a user whether to permit communication is performed, so that a security-related issue can be addressed.

However, in a case where a plurality of printers with unreliable server certificates is present in the communication range of Bluetooth®, the mobile terminal makes the above-described inquiry a plurality of times, and this is burdensome to the user.

SUMMARY

The present disclosure is directed to preventing a reduction in usability even in a case where a plurality of printers with unreliable server certificates is in a communication range of Bluetooth® when a mobile terminal searches for a printer.

According to an aspect of the present disclosure, a method for an information processing apparatus searching for an image processing device includes receiving a predetermined beacon transmitted from an image processing device, identifying an image processing device satisfying a predetermined condition, based on the predetermined beacon, among one or more image processing devices corresponding to the received predetermined beacon, issuing a first request for a server certificate to the identified image processing device, by wireless local area network (LAN) communication, performing first acquisition of the server certificate from the image processing device as a response to the first request, determining whether the server certificate obtained in the first acquisition is reliable, and issuing a warning in a case where the server certificate is determined to be unreliable.

Further features will become apparent from the following description of exemplary embodiments with reference to the attached drawings.

BRIEF DESCRIPTION OF THE DRAWINGS

FIGS. 7A to 7E are diagrams each illustrating an example of a screen to be displayed in the data processing apparatus according to the first exemplary embodiment.

FIG. 10 is a sequence diagram illustrating an example of an outline of communication between the data processing apparatus and the image processing device.

DESCRIPTION OF THE EMBODIMENTS

Exemplary embodiments of the present disclosure will be described in detail below with reference to the attached drawings. In each of the exemplary embodiments, a data processing apparatus will be described as an example of an information processing apparatus, but the present disclosure according to the scope of claims is not limited thereto. In addition, all of combinations of features described in the exemplary embodiments are not essential for a solution of the present disclosure.

Figure 1:
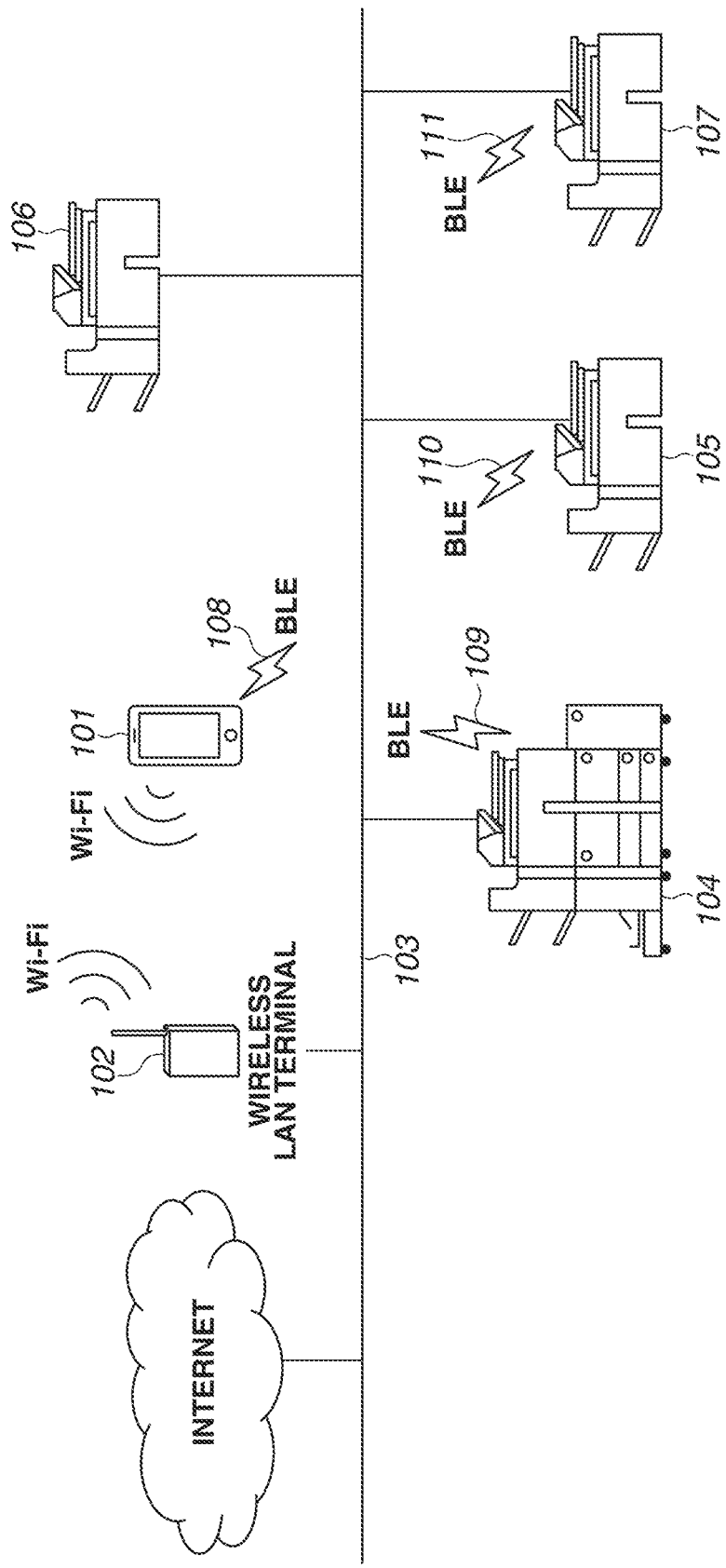
FIG. 1 is a diagram illustrating an example of a data processing system.

A first exemplary embodiment of the present disclosure will be described in detail below with reference to the drawings. FIG. 1 is a diagram illustrating a configuration of a data processing system in the present exemplary embodiment. In FIG. 1, a data processing apparatus 101 is a mobile-type data processing apparatus that is a computer configured to transmit a print job to each of image processing devices 104, 105, 106, and 107. The image processing devices 104, 105, 106, and 107 may each have a copy function, a scanning function, and a facsimile transmission function, in addition to the printing function.

A local area network (LAN) 103 is a network to which the data processing apparatus 101 and the image processing devices 104, 105, 106, and 107 are connected to exchange information in mutual communication via the LAN 103. A wireless LAN terminal 102 is a base unit of a wireless LAN having a general network/router function and provides the wireless LAN in a place such as home or office. The data processing apparatus 101 is a mobile terminal and is connected to the LAN 103 via the wireless LAN terminal 102. When entering a wireless LAN area provided by the wireless LAN terminal 102, the data processing apparatus 101 can be automatically connected to the LAN 103 using authentication information set beforehand. Wireless signals 108, 109, 110, and 111 are signals transmitted and received using Bluetooth® Low Energy, by the data processing apparatus and the image processing devices. A wireless personal area network (WPAN) can be formed between the data processing apparatus and the image processing device that exchange the wireless signals.

Figure 2:
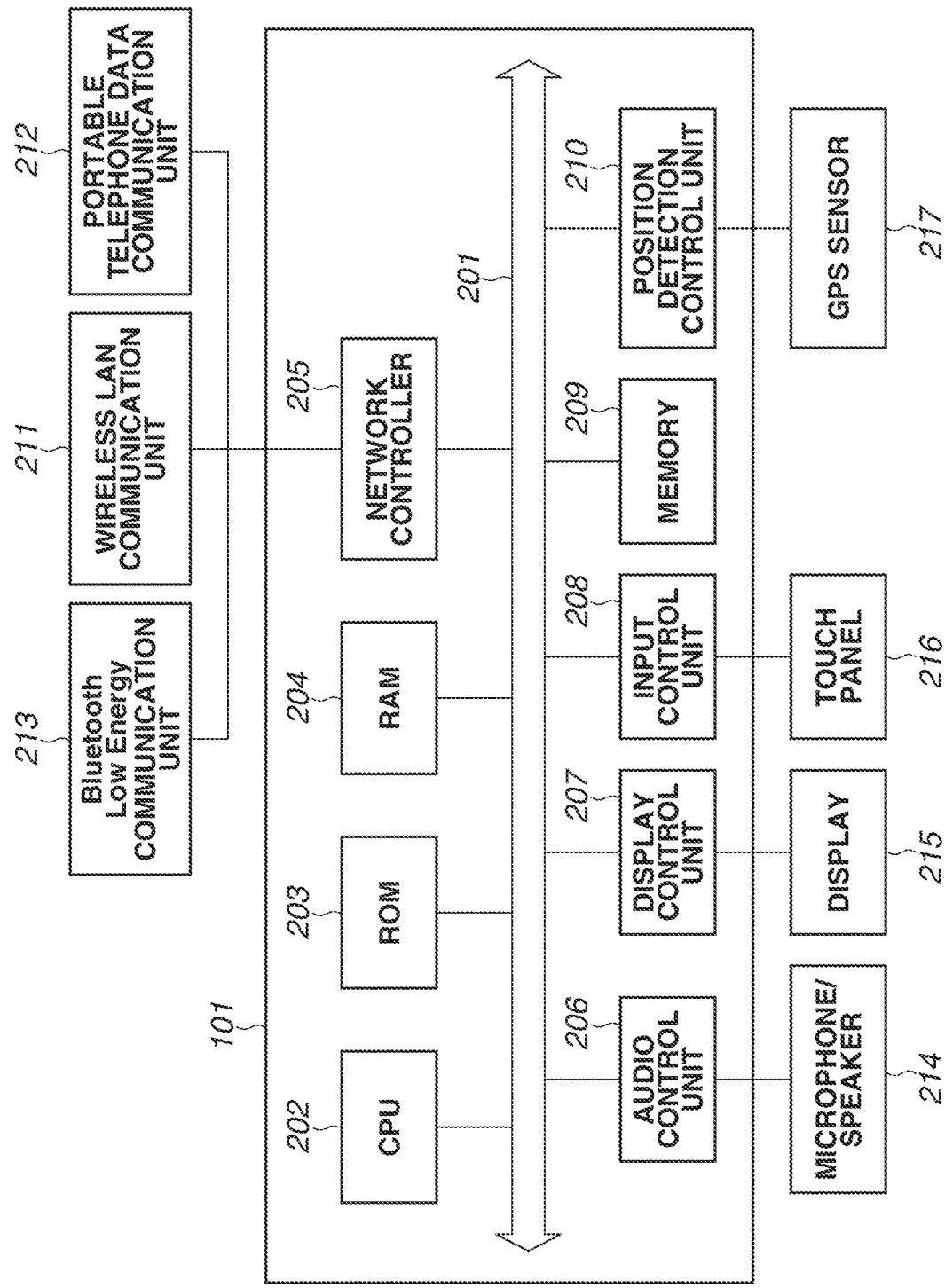
FIG. 2 is a diagram illustrating an example of a hardware configuration of a data processing apparatus.

FIG. 2 is a block diagram illustrating an example of a hardware configuration of the data processing apparatus 101 in FIG. 1. The data processing apparatus 101 is, for example, a terminal such as a smartphone or a tablet, and an operating system for the terminal and programs for controlling phone calls and data communication may run on thereon. Alternatively, the data processing apparatus 101 may be a personal computer not including an audio control unit 206, a microphone/speaker 214, a position detection control unit 210, a Global Positioning System (GPS) sensor 217, and a portable telephone data communication unit 212 to be described below.

Each component of the hardware is connected to a system bus 201. An operating system for the data processing apparatus 101 and applications for controlling phone calls and data communication are stored in a read-only memory (ROM) 203, and executed by a central processing unit (CPU) 202. The applications for controlling the data communication include a print application, e-mail software, and a web browser.

A random access memory (RAM) 204 is a memory for executing a program, and is a work memory area for execution of a program by the CPU 202. The RAM 204 is also a memory for temporarily storing data to be saved during the execution of the program by the CPU 202. A memory 209 is a nonvolatile memory, and stores an operation log and various operation mode settings to be held when the data processing apparatus 101 is reactivated.

A network controller 205 controls communication by a wireless LAN communication unit 211, the portable telephone data communication unit 212, and a Bluetooth® Low Energy communication unit 213. The wireless LAN communication unit 211 is intended for connection to the LAN 103 via the wireless LAN terminal 102. The portable telephone data communication unit 212 is intended for connection to a network provided by a mobile phone carrier. The Bluetooth® Low Energy communication unit 213 is intended for formation of a WPAN between peripheral computer devices that exchange wireless signals by Bluetooth® Low Energy. Typically, the network controller 205 gives priority to connection to a wireless LAN when the data processing apparatus 101 can be connected to the wireless LAN. In a case where the data processing apparatus 101 leaves the network area of the wireless LAN, although exclusion control for connecting the data processing apparatus 101 to a wireless communication network provided by a mobile phone carrier is performed, communication control for excluding the data processing apparatus 101 from communication with other communication units is not performed in the Bluetooth® Low Energy communication.

The audio control unit 206 is used when, for example, a phone call application is activated and a user talks on the telephone. Audio data is input/output using the microphone/speaker 214, and the audio control unit 206 mediates between the audio data and an audio data control program.

A display control unit 207 controls information to be output on a display 215 of the data processing apparatus 101. An input control unit 208 controls information corresponding to an instruction provided by the user using a button or a touch panel 216 of the data processing apparatus 101. Through the audio control unit 206, the display control unit 207, and the input control unit 208, the application activated on the data processing apparatus 101 provides the user with network communication information and various kinds of information of the data processing apparatus 101.

The position detection control unit 210 acquires information indicating the position of the data processing apparatus 101 from the GPS sensor 217, and provides the acquired information to the operating system. These controls are performed by the operating system operated by the CPU 202.

Figure 3:
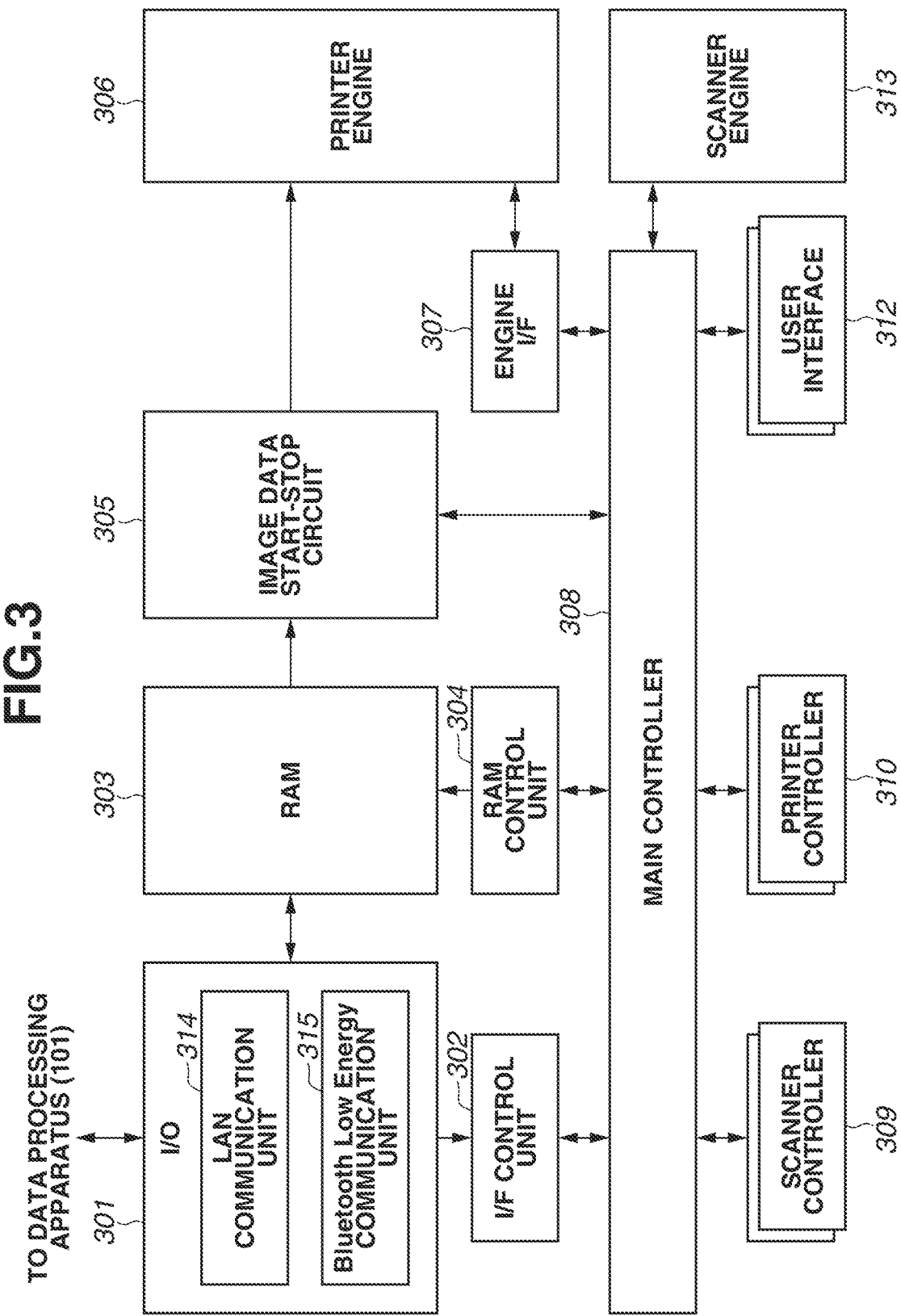
FIG. 3 is a diagram illustrating an example of a hardware configuration of an image processing device.

FIG. 3 is a block diagram illustrating an example of a hardware configuration of the image processing device (each of the image processing devices 104, 105, 106, and 107, respectively) in FIG. 1. The image processing device of the present exemplary embodiment will be described using a multi function peripheral (MFP) having a scanning function and a printing function, as an example.

In FIG. 3, an output/output (I/O) 301 includes a LAN communication unit 314 and a Bluetooth® Low Energy communication unit 315, for example. The LAN communication unit 314 can communicate with the data processing apparatus 101 via the LAN 103. The Bluetooth® Low Energy communication unit 315 can communicate with a device within a WPAN where communication is enabled by transmission/reception based on Bluetooth® Low Energy. The image processing device passes a device ID and a scanned image to the data processing apparatus 101 via the I/O 301. Further, the image processing device performs processing, upon receiving various control commands corresponding to issued instructions from the data processing apparatus 101.

An interface (I/F) control unit 302 controls issuance of a device ID for a processing system such as a scanner, a printer, or a facsimile in the image processing device. A RAM 303 is a primary memory, and is used to store external data such as control commands acquired via the I/O 301, and image data (hereinafter, "image") read by a scanner engine 313.

Further, the RAM 303 is used for, for example, storage of an image developed by a printer controller 310 before being passed to a printer engine 306. A RAM control unit 304 manages allocation of the RAM 303.

An image data start-stop circuit 305 outputs an image developed by the printer controller 310, and an image captured by the scanner engine 313 and loaded into the RAM 303, in synchronization with the rotation of the printer engine 306. The printer engine 306 is a device that develops an image on an output medium such as paper.

A main controller 308 performs various types of control of the printer engine 306 via an engine I/F 307. Further, the main controller 308 is an important module for control, and performs appropriate processing for allocating a control language received from the data processing apparatus 101 via the I/O 301 to a scanner controller 309 and the printer controller 310. Furthermore, the main controller 308 receives instructions from each of these controllers and a user interface 312, and controls the printer engine 306 and the scanner engine 313 based on the received instructions.

The scanner controller 309 converts a scan control command received from the data processing apparatus 101 into an internal execution command that can be interpreted by the main controller 308. Further, the scanner controller 309 changes an image read by the scanner engine 313 to a scan control command.

The printer controller 310 converts a page-description language (PDL) received from the data processing apparatus 101 as a print job, to an internal execution command including a developed image that can be interpreted by the main controller 308. The developed image is carried to the printer engine 306 and then printed on an output medium such as a sheet.

Figure 4:
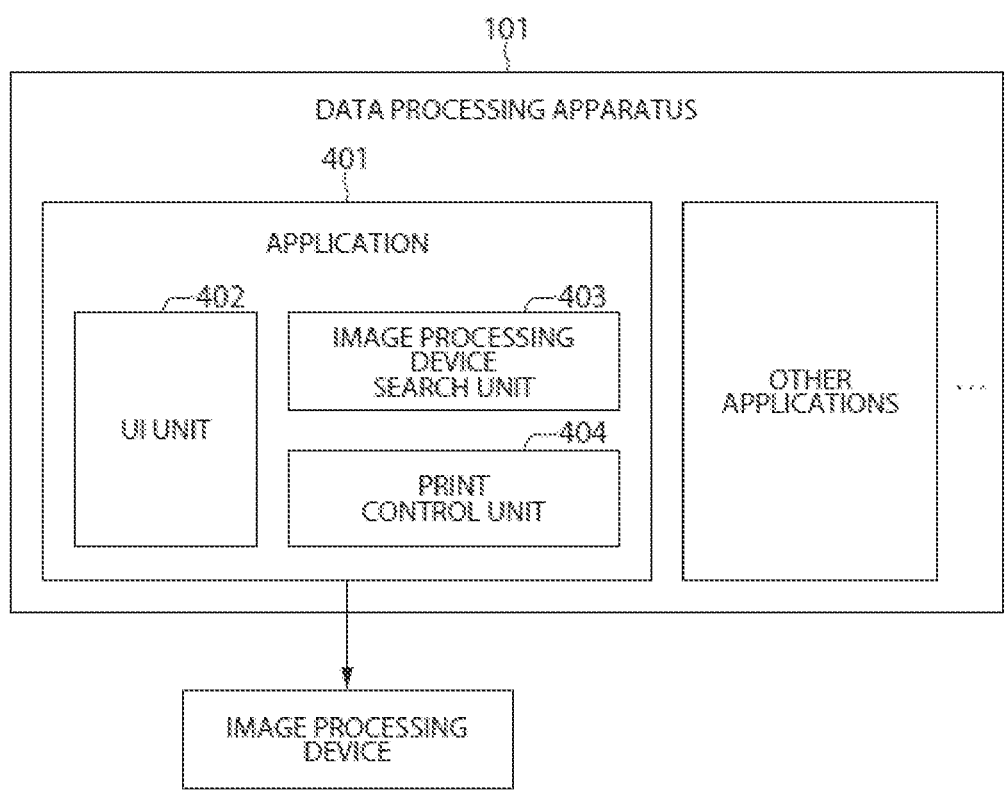
FIG. 4 is a diagram illustrating an example of a configuration of software of the data processing apparatus.

FIG. 4 is a block diagram illustrating an example of a configuration of software of the data processing apparatus 101 illustrated in FIG. 1. A print application 401 executes processing of the present exemplary embodiment on the data processing apparatus 101, and is installed on the ROM 203 as an application that runs on the OS. A user interface (UI) unit 402 of the print application 401 provides a user interface for enabling the user to set an application-specific function. An image processing device search unit 403 searches for network devices supporting multicast Domain Name System (multicast DNS or mDNS), on the LAN 103 to which the data processing apparatus 101 is connected. The image processing device search unit 403 provides a function of acquiring detailed information of the image processing device based on Internet Printing Protocol (IPP) from the image processing device to which the data processing apparatus 101 can issue a print instruction, among the network devices reachable from the LAN 103. The image processing device search unit 403 also provides a function of searching for the image processing device to which the data processing apparatus 101 can issue a print instruction, in a WPAN where communication is enabled by transmission/reception based on Bluetooth® Low Energy. A print control unit 404 provides a function of generating a print job and transmitting the generated print job to the image processing device with which communication can be established.

Figure 5:
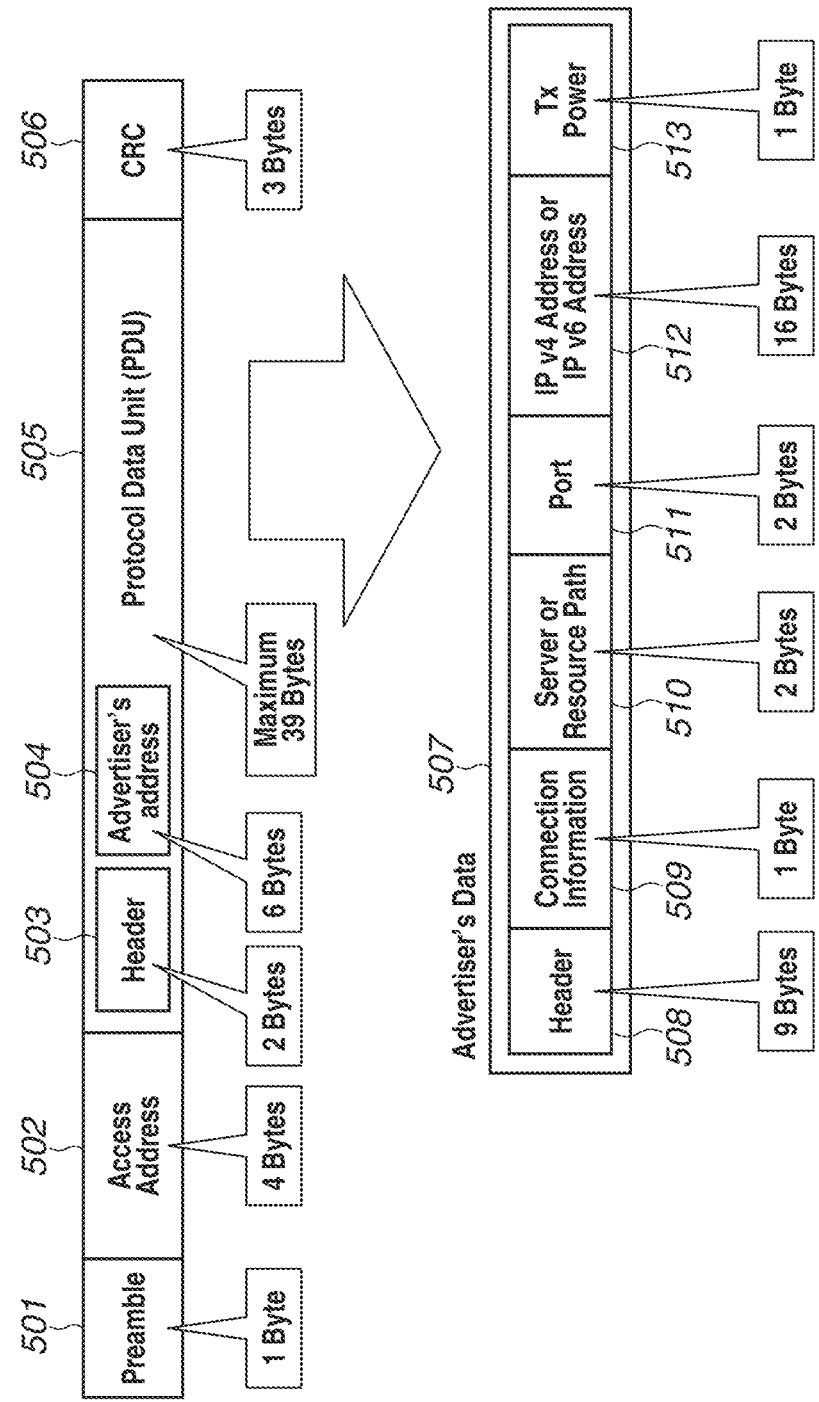
FIG. 5 is a diagram illustrating an example of an advertising packet of Bluetooth® Low Energy.

FIG. 5 illustrates an example of an advertising packet of Bluetooth® Low Energy transmitted from each of the image processing devices 104, 105, and 107. The advertising packet of Bluetooth® Low Energy is wireless beacon data broadcasted as a beacon signal, and is transmitted at intervals of several milliseconds to several seconds.

First, at the head of the advertising packet of Bluetooth® Low Energy, a preamble 501 to be used by a wireless element of Bluetooth® Low Energy for the timing of reading a signal is configured of 1 byte. Next, an access address 502 for inserting a value indicating that the packet is an advertising packet of Bluetooth® Low Energy is configured of 4 bytes. Next, a protocol data unit 505 is configured of 39 bytes at maximum, as an actual data area. In the protocol data unit 505, 2 bytes are consumed as a header 503 and 6 bytes are consumed as an advertiser's address 504, and thus advertiser's data 507 is configured of the remaining 31 bytes. An example of the advertiser's data 507 will be described. A header 508 that is a value common to beacons is configured of 9 bytes.

Next, connection information 509 indicates the format of an Internet Protocol (IP) address and whether the image processing device transmitting the advertising packet is a printer or a print server, and the connection information 509 is configured of 1 byte. Next, a server or resource path 510 indicating identification (ID) information of a printer defined by a server is configured of 2 bytes. Next, a port 511 indicating a port number is configured of 2 bytes. Next, the IP address, an IP v4 address or IP v6 address 512, is configured of 16 bytes. Finally, a Tx power 513 indicating a transmission radio wave strength of the beacon is configured of 1 byte. At the end of the advertising packet of Bluetooth® Low Energy, a cyclic redundancy check (CRC) 506 for code error detection is configured of 3 bytes. The entire advertising packet is thus configured. However, the configuration of the data is not limited thereto.

FIG. 10 illustrates an outline of operation in which the data processing apparatus 101 in the present exemplary embodiment searches for the image processing device by Bluetooth® Low Energy and transmits a print job to the device found in the search. In step S1001, the data processing apparatus 101 receives an advertising packet transmitted by a peripheral device upon receiving an instruction to search for the image processing device from the print application 401. The received advertising packet includes device information such as an IP address, but does not include detailed information such as a device name.

Next, the data processing apparatus 101 issues a request for acquisition of the detailed information of the device to the image processing device based on the received advertising packet, but operation varies depending on whether the communication is based on IPP or IPP secure version (IPPS). Whether the communication is performed based on IPP or IPPS depends on the received advertising packet. For example, if the image processing device supports IPP communication by Transport Layer Security (TLS) or Secure Sockets Layer (SSL), information indicating this type of communication is included in the advertising packet, and therefore encryption communication by IPPS is performed with the device.

In a case where the communication is performed based on IPP, in step S1011, the data processing apparatus 101 issues a detailed-information acquisition request by IPP to the image processing device that has transmitted the advertising packet. In response to the request, in step S1012, the image processing device transmits the detailed information to the data processing apparatus 101. The detailed information includes the name of the image processing device.

In a case where the communication is performed based on IPPS, at first, in step S1021, the data processing apparatus 101 transmits a TLS negotiation request. Upon receiving the TLS negotiation request, in step S1022, the image processing device transmits a server certificate which it is holding, to the data processing apparatus 101. Upon receiving the server certificate, in step S1023, the data processing apparatus 101 verifies the received server certificate using a Certificate Authority (CA) certificate which it is holding. If the reliability of the server certificate is successfully verified in step S1023, the processing proceeds to step S1024. The processing may be stopped in this step or may proceed to step S1024 if the server certificate is determined to be unreliable in step S1023, or the processing may proceed to step S1024 if the user permits the communication after being inquired whether to permit the communication. Here, in the case where the server certificate is a self-signed (self-issued) server certificate or an expired server certificate, the server certificate cannot be verified In step S1024, the data processing apparatus 101 issues a detailed-information acquisition request based on IPPS to the image processing device. In response to this request, in step S1025, the image processing device transmits the detailed information to the data processing apparatus 101. The detailed information includes the name of the image processing device. The above-described sequence is performed for all the image processing devices whose advertising packets of Bluetooth® Low Energy are successfully detected. In step S1030, the data processing apparatus 101 displays the devices whose detailed information is successfully acquired among the image processing devices successfully detected by Bluetooth® Low Energy, in list form. In step S1040, the data processing apparatus 101 selects one image processing device from the list in response to an event such as a user operation, and registers the selected device as a print instruction target. In step S1050, the data processing apparatus 101 displays a print setting screen for the registered image processing device. The data processing apparatus 101 receives print settings made on the print setting screen. In step S1060, the data processing apparatus 101 transmits a print job reflecting the received settings to the image processing device. The image processing device performs printing based on the received print job.

Figure 7A:
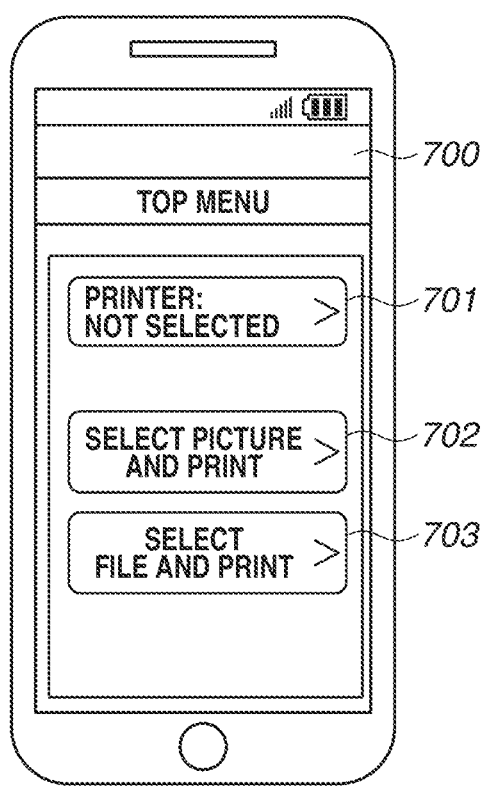

FIGS. 7A to 7E illustrate an example of the screen of the data processing apparatus 101 related to the sequence in FIG. 10. A print application home screen 700 in FIG. 7A is a top menu screen immediately after the print application 401 is activated in the data processing apparatus 101, and is a user interface for receiving various input operations from the user. A button 701 is used for transition to a screen for selecting the image processing device as the print instruction target, and displays a non-selection status when no device is selected. A button 702 is used for transition to a screen for selecting a picture stored in the data processing apparatus 101 and printing the selected picture. In a case where the image processing device is not selected as the print instruction target, the button 702 remains disabled even if pressed. A button 703 is used for transition to a screen for selecting a file such as a Portable Document Format (PDF) file stored in the data processing apparatus 101 and printing the selected file. In a case where the image processing device is not selected as the print instruction target, the button 702 remains disabled even if pressed, as with the button 702.

Figure 7B:
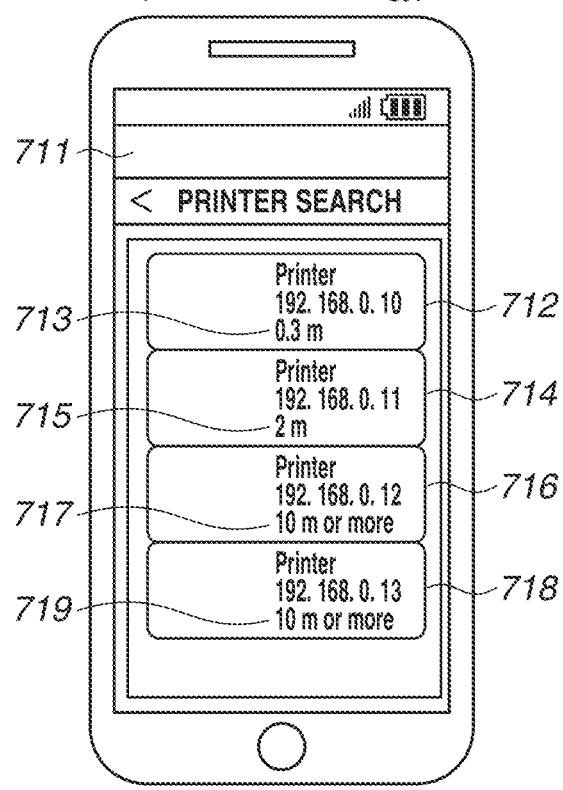

A device search screen 711 (a search by Bluetooth® Low Energy) in FIG. 7B is displayed when the button 701 is pressed in the print application home screen 700 (a screen in step 1001 in FIG. 10). The device search screen 711 (the search by Bluetooth® Low Energy) is a screen for selecting the image processing device as the print instruction target, and is a user interface that displays the result of searching for the image processing devices by Bluetooth® Low Energy, in a list. The list is created based on the advertising packet of Bluetooth® Low Energy received by the data processing apparatus 101. Here, list items 712, 714, 716, and 718 correspond to the image processing devices 104, 105, 106, and 107, respectively, found in the search. Because the information acquired using Bluetooth® Low Energy includes only the IP addresses but does not include the detailed information of the devices, "Printer" is displayed. The device search screen 711 may not be displayed.

Distances 713, 715, 717, and 719 between the data processing apparatus 101 and the respective image processing devices are also displayed. Each of these distances is calculated based on at least the radio wave strength of the received advertising packet. The data processing apparatus 101 acquires the radio wave strength of the received advertising packet transmitted from the image processing device. The received radio wave strength by Bluetooth® Low Energy can be acquired from a framework for Bluetooth® Low Energy control provided by the OS, as Received Signal Strength Indication (RSSI). For example, in the case of iOS, RSSI can be acquired from a framework for Bluetooth® Low Energy control, provided as "Core Bluetooth® framework". Here, the distance may be calculated using only the acquired RSSI, or may be calculated using RSSI and the Tx power 513 included in the beacon.

A server certificate confirmation screen 720 in FIG. 7C is a warning screen to be displayed when the received server certificate is determined to be unreliable (step S1023 in FIG. 10) when the detailed information of the device from which the advertising packet of Bluetooth® Low Energy is received is acquired based on the IPPS communication on the device search screen 711. Examples of the case where the server certificate is unreliable include a case where the server certificate is a self-signed server certificate. A confirmation window pop-up 721 displayed on a display unit includes information inquiring of the user whether to permit communication with the image processing device corresponding to the unreliable server certificate.

A device search screen 730 (update) in FIG. 7D is a search result screen displayed by updating the device search screen 711 using the detailed information acquired by the IPP or IPPS communication (a screen after each of step S1012 and step S1025 in FIG. 10). A list item 731 displays the device name acquired by IPP or IPPS. The device name is a part of the detailed information, and the detailed information can include the type of a color printer/monochrome printer, the type of an A3/A4 machine, and the presence/absence of various functions, and thus such information may be displayed.

Figure 6:
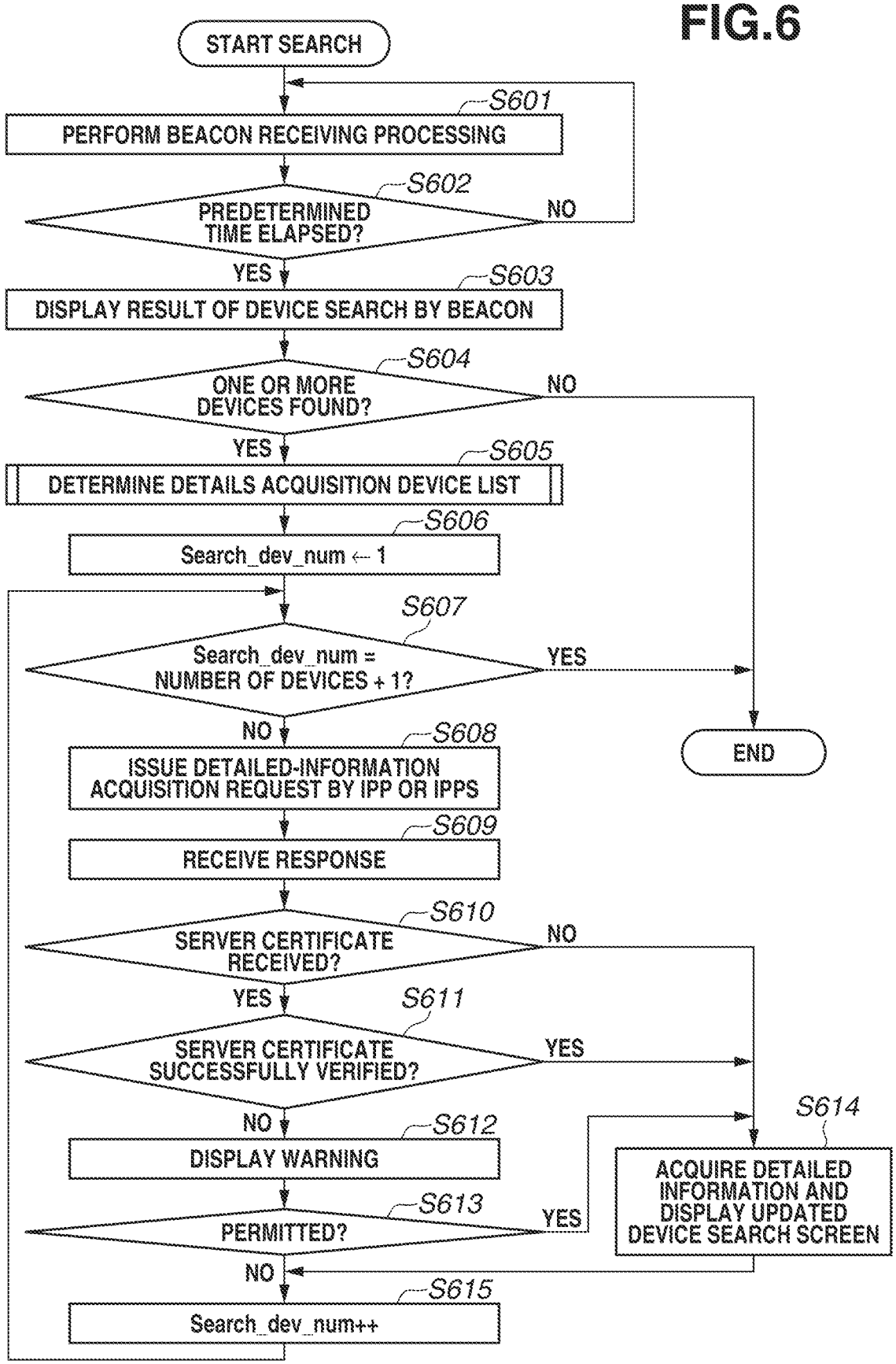
FIG. 6 is a flowchart illustrating an example of a flow of device search processing by the data processing apparatus according to a first exemplary embodiment.

FIG. 6 is a flowchart about processing of searching for the image processing device to be executed by the print application 401 running on the data processing apparatus 101. The CPU 202 loads a control program stored in a memory such as the ROM 203 into the RAM 204 and executes the loaded control program, so that each step of the flowchart in FIG. 6 is processed.

In step S601, the print application 401 performs processing of receiving the Bluetooth® beacon from the image processing device. Specifically, the print application 401 receives the advertising packet of Bluetooth® Low Energy. The print application 401 acquires packet format information from the received advertising packet. The print application 401 determines whether the image processing device is supported by the print application 401, by confirming the header 508 of the advertising packet.

In step S602, the print application 401 determines whether a predetermined time has elapsed in the processing of receiving the beacon. If the predetermined time has elapsed (YES in step S602), the processing proceeds to step S603. If the predetermined time has not elapsed (NO in step S602), the processing returns to step S601.

In step S603, the print application 401 displays the image processing device which is supported by the application and has been found in the search using the beacon received in step S601, on the device search screen 711 (Bluetooth® Low Energy) in FIG. 7B.

In step S604, the print application 401 determines whether one or more image processing devices have been found in the search using the beacon. If one or more image processing devices have not been found (NO in step S604), the processing ends. If one or more image processing devices are found (YES in step S604), the processing proceeds to step S605.

In step S605, the print application 401 determines a list of devices (hereinafter, "details acquisition device list") whose detailed information is to be acquired by IPP or IPPS (the server certificate is to be requested in the case of IPPS), among the image processing devices found in the search using the beacons. This will be described in detail below with reference to a flowchart in FIG. 8. The details acquisition device list is stored in a work area.

In step S606, the print application 401 sets a control variable Search_dev_num of the details acquisition device list to 1. In step S607, the print application 401 determines whether "Search_dev_num" and "the number of devices included in the details acquisition device list+1" are equal. If these values are equal (YES in step S606), the processing ends. If these values are not equal (NO in step S606), the processing proceeds to step S608.

In step S608, the print application 401 issues a detailed-information acquisition request based on IPP or IPPS to the image processing device of the (Search_dev_num)th of the details acquisition device list. Here, in the case of the communication based on IPPS, the print application 401 also issues a request for the server certificate to the device.

In step S609, the print application 401 receives a response to the acquisition request issued in step S608 from the device.

In step S610, the print application 401 determines whether the server certificate is received in step S609. In the case of the IPPS communication, the server certificate is included, but the server certificate is not included otherwise. If the server certificate is not included (NO in step S610), the processing proceeds to step S614.

In step S611, the print application 401 determines whether the reliability of the server certificate is successfully verified. If the reliability of the server certificate is successfully verified (YES in step S611), the processing proceeds to step S614. If the reliability of the server certificate is not successfully verified (NO in step S611), the processing proceeds to step S612. Here, the processing may proceed to step S614 even if the server certificate is determined to be unreliable.

In step S612, the print application 401 displays the server certificate confirmation screen 720 (the warning screen) in FIG. 7C, and inquires of the user whether to permit the communication. The processing then proceeds to step S613.

In step S613, the print application 401 determines whether the communication is permitted, by confirming an input from the user. If the print application 401 determines that a YES button 722 is pressed (YES in step S613), the processing proceeds to step S614. If a NO button 723 is pressed (NO in step S613), the processing proceeds to step S615.

In step S614, the print application 401 acquires the detailed information based on a response from the image processing device by IPP or IPPS, and displays the device search screen 730 (update) in FIG. 7D using the acquired information.

In step S615, the print application 401 increments Search_dev_num by 1, and returns to step S607.

In the above-described flowchart, the print application 401 acquires the detailed information by IPP or IPPS only for the details acquisition device list, i.e., the request for the server certificate is not issued to all the devices. Therefore, inquiring of the user about the permission for communication due to the lack of reliability of the server certificate is not performed more than necessary.

Figure 8:
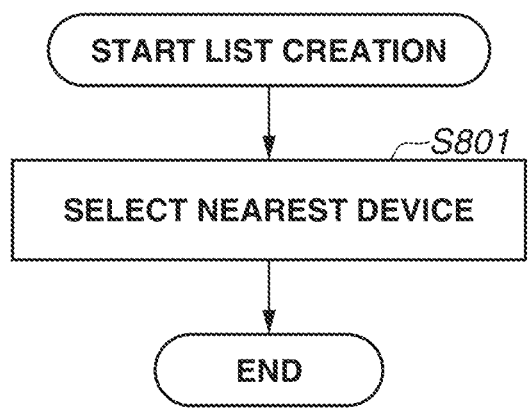
FIG. 8 is a flowchart illustrating an example of a processing flow of determining a list for acquiring detailed information of a device in the data processing apparatus according to the first exemplary embodiment.

FIG. 8 is a flowchart for determining the details acquisition device list. In the present exemplary embodiment, only the nearest image processing device is added to the details acquisition device list.

In step S801, the print application 401 selects the nearest image processing device by comparing the image processing devices in terms of a component such as the radio wave strength of the advertising packet of Bluetooth® Low Energy received in step S601, and adds the selected nearest image processing device to the detail acquisition device list. Here, the device nearest to the data processing apparatus 101 may be determined using only RSSI, or may be determined using RSSI and the Tx power 513 of each of the devices. This flow can limit the acquisition of the detailed information by the data processing apparatus 101 based on IPP or IPPS, to only the image processing device nearest to the data processing apparatus 101. In other words, the number of the devices to which the request for the server certificate is issued is only one at most. In the present exemplary embodiment, only the image processing device nearest to the data processing apparatus 101 is added to the details acquisition device list, but the present exemplary embodiment is not limited thereto. Several image processing devices may be added to the list, in order of increasing distance from the data processing apparatus 101. If the user does not permit the communication with the nearest image processing device in step S613, the print application 401 may issue a detailed-information acquisition request to the second nearest image processing device. In this case, the search processing ends when the detailed information is successfully acquired from one of the devices.

Figure 7E:
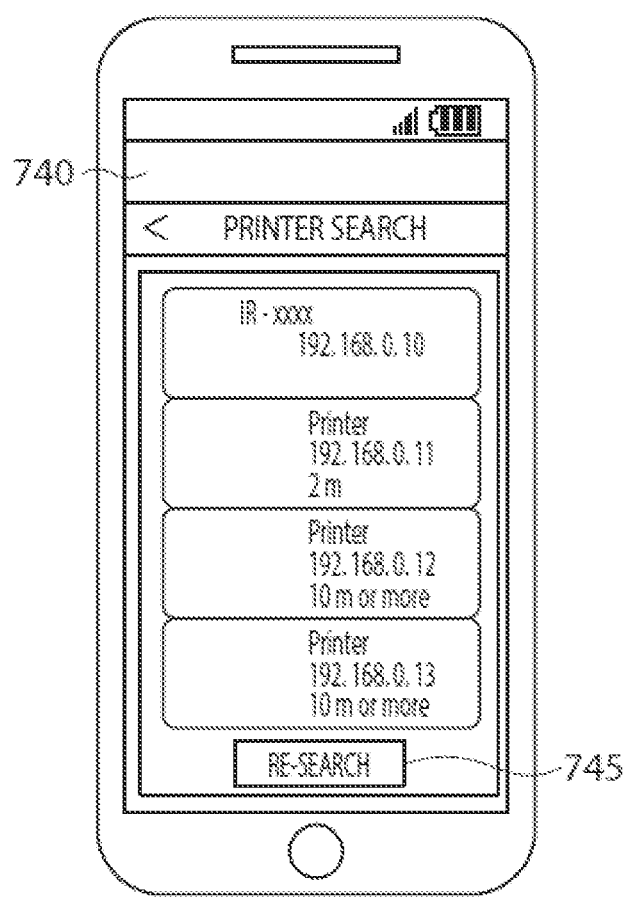

In a case where the detailed information is acquired from only one device as in the present exemplary embodiment, only the information of the device corresponding to the successfully acquired detailed information may be displayed in an updated state and the information of other devices may be displayed in a non-updated state among the devices on the device search screen 730 (update) of the data processing apparatus 101 (as illustrated in a device search screen 740 (update) in FIG. 7E). A re-search button (a button 745 in FIG. 7E) may be displayed on the updated search screen, and the search screen may be updated by acquiring the detailed information from another device corresponding to the yet-to-be-acquired detailed information when the re-search button is pressed. Further, only the information of the one device corresponding to the successfully acquired detailed information may be displayed on the device search screen 740 (update) and the information of other devices may not be displayed. Furthermore, if there is only one device corresponding to the acquired detailed information, the data processing apparatus 101 may automatically perform the processing (step S1040 in FIG. 10) of registering this device as the print instruction target (a target for transmission of a print job), instead of displaying the device search screen 730 (update). Further, the print setting screen may be automatically opened (step S1050 in FIG. 10) in a state where this device is registered as the print instruction target.

In the above-described processing, the data processing apparatus 101 issues the detailed-information acquisition request based on IPP or IPPS to only the one image processing device that satisfies a predetermined condition of being nearest to the data processing apparatus 101, in the search for the image processing device performed by the data processing apparatus 101. Even if issuing the request for the server certificate is desirable, this request is issued to only one device. Therefore, even in a case where the server certificate of the image processing device corresponding to attempted acquisition of the detailed information is unreliable, it is sufficient to inquire of the user about the permission only once. In addition, because the detailed-information acquisition request is not issued to the image processing devices that are not near the data processing apparatus 101 and are unlikely to be used by the user, the inquiry about the permission for these devices may not be made. In other words, a device search can be performed without impairing usability.

A second exemplary embodiment will be described below. In the first exemplary embodiment, the detailed information is acquired based on IPP or IPPS only from the one image processing device nearest to the data processing apparatus 101, but the nearest device may not be a device desired by the user. Therefore, in the present exemplary embodiment, an example of acquiring the detailed information of a plurality of devices within a predetermined distance from the data processing apparatus 101 will be described.

The basic configuration of processing of searching for the image processing device to be executed by the print application 401 running on the data processing apparatus 101 is similar to that in the first exemplary embodiment, and the difference lies in the method of creating the detail acquisition device list. Therefore, processing for the detail acquisition device list will be described.

Figure 9:
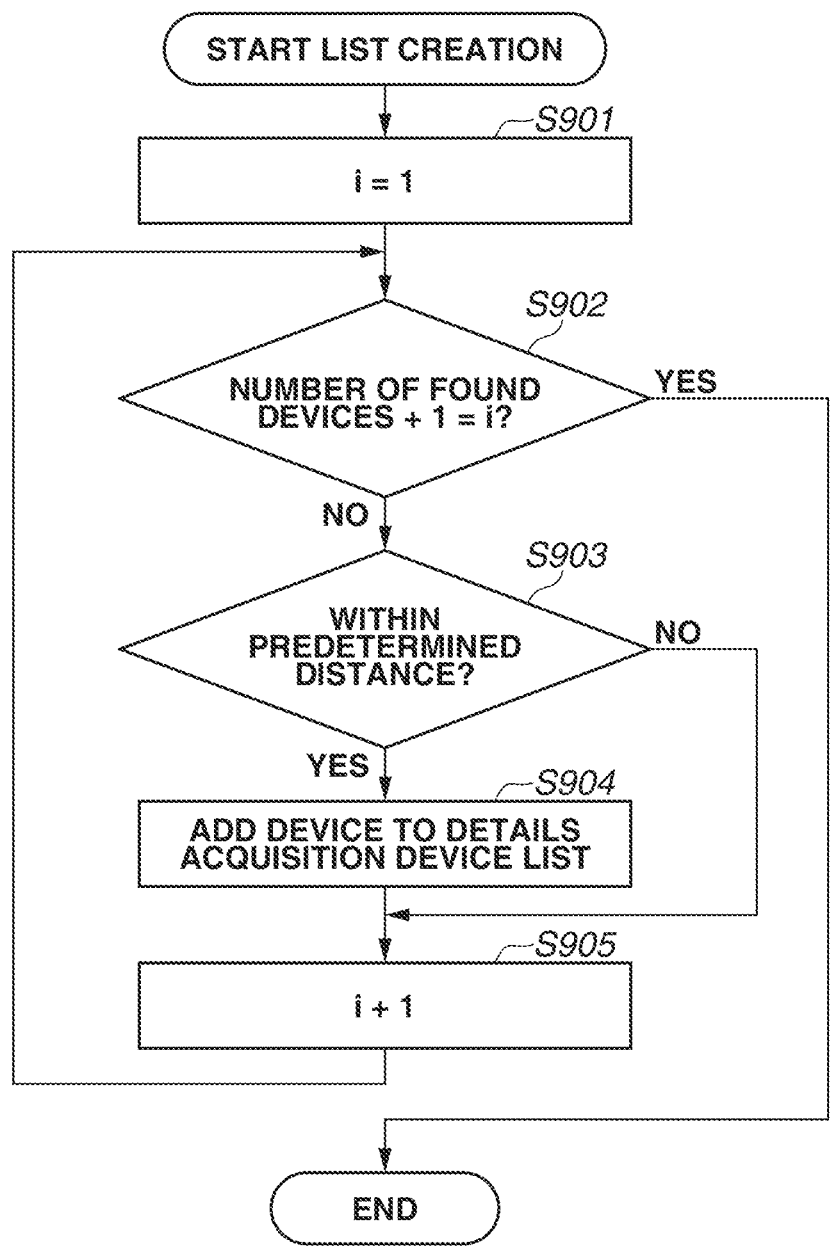
FIG. 9 is a flowchart illustrating an example of a processing flow of determining a list for acquiring detailed information of a device in the data processing apparatus according to a second exemplary embodiment.

FIG. 9 is a flowchart for determining the details acquisition device list. In the present exemplary embodiment, the flowchart represents processing of determining the image processing device within a predetermined distance.

In step S901, the print application 401 initializes a control variable i to 1. In step S902, the print application 401 determines whether the "control variable i" and "the number of image processing devices found in a search using a beacon+1" are equal. If these values are equal (YES in step S902), the processing ends. If these values are not equal (NO in step S902), the processing proceeds to step S903.

In step S903, the print application 401 determines whether the i-th image processing device among the plurality of image processing devices found in the search using the beacons is within the predetermined distance. Specifically, if the radio wave strength of Bluetooth® Low Energy received from the image processing device is higher than or equal to a predetermined strength, the print application 401 determines that the image processing device is within the predetermined distance. If the print application 401 determines that the image processing device is within the predetermined distance (YES in step S903), the processing proceeds to step S904. If the print application 401 determines that the image processing device is not within the predetermined distance (NO in step S903), the processing proceeds to step S905.

In step S904, the print application 401 adds the image processing device to the details acquisition device list, and the processing proceeds to step S905. In step S905, the print application 401 increments "i" by 1, and the processing returns to step S902.

In the present exemplary embodiment, the image processing device whose detailed information is to be acquired is the image processing device within the predetermined distance. However, a distance within a predetermined value may also be set by the user.

Further, in a case where many image processing devices are within the predetermined distance from the data processing apparatus 101, the detailed-information acquisition request may be issued only to a predetermined number of devices in order of increasing distance. This prevents issuing the request for the server certificate to the many devices.

In the above-described processing, the data processing apparatus 101 issues the detailed-information acquisition request based on IPPS to only the one image processing device that satisfies the condition of being near the data processing apparatus 101, in the search for the image processing device performed by the data processing apparatus 101. In other words, the data processing apparatus 101 requests the server certificate, and therefore, a number of cases of making an inquiry about permission for communication with the image processing device corresponding to an unreliable server certificate can be minimized.

Other Exemplary Embodiments

In a case where the data processing apparatus 101 and the image processing device support Bluetooth® 5.1 or later, the data processing apparatus 101 can recognize a direction in which the image processing device is present, when a beacon is received from the image processing device. Therefore, the data processing apparatus 101 may issue the detailed-information acquisition request (the request for the server certificate) based on IPPS only to the image processing device in a specific direction relative to the data processing apparatus 101 (e.g., the image processing device is in front of the data processing apparatus 101 when the data processing apparatus 101 is held straight). Further, the data processing apparatus 101 may issue the detailed-information acquisition request based on IPP or IPPS only to the image processing device that is near the data processing apparatus 101 and in a specific direction.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-180375, filed Sep. 30, 2019, which is hereby incorporated by reference herein in its entirety.

What is claimed is:

1. A method for an information processing apparatus to search for an image processing device, the method comprising:
   receiving a plurality of Bluetooth signals transmitted respectively from first and second image processing devices;
   displaying a first screen in a case where the plurality of Bluetooth signals is received, wherein the first screen includes first information of the first image processing device without including a device name of the first image processing device and includes second information of the second image processing device without including a device name of the second image processing device;
   identifying the first image processing device corresponding to a highest received signal strength of a received Bluetooth signal, among the first and second image processing devices corresponding to the received plurality of Bluetooth signals;
   requesting the first image processing device to issue a server certificate in a case where the identified first image processing device supports Internet Printing Protocol (IPP) secure version (IPPS) communication;
   acquiring device information from the first image processing device using the IPPS communication in a case where the server certificate acquired based on the request to issue the server certificate is determined to be reliable;
   displaying, based on the acquired device information, a second screen including the device name of the first image processing device and the second information of the second image processing device without including the device name of the second image processing device; and
   displaying a warning screen in a case where the server certificate acquired based on the request to issue the server certificate is determined not to be reliable.

2. The method according to claim 1, wherein the displayed warning screen includes information inquiring of a user whether to permit communication with an image processing device from which an unreliable server certificate has been transmitted.

3. The method according to claim 1, further comprising performing encryption communication with an image processing device corresponding to the server certificate determined to be reliable, and with an image processing device for which information indicating permission of communication has been received as a response to the displayed warning screen.

4. The method according to claim 1, further comprising acquiring, based on reception of a user operation via the second screen and by using the IPP or IPPS communication, device information from the second image processing device other than the first image processing device.

5. The method according to claim 1, further comprising displaying, on the second screen, the first and second image processing devices corresponding to the received plurality of Bluetooth signals in descending order of received signal strength of the received plurality of Bluetooth signals.

6. The method according to claim 1, further comprising acquiring device information from the first image processing device using the IPP communication in a case where the identified image processing device supports IPP communication.

7. The method according to claim 1, wherein acquiring device information includes acquiring device information using the IPP or IPPS communication from the second image processing device but not acquiring the device information until a predetermined user operation is received.

8. The method according to claim 1, wherein each of the received plurality of Bluetooth signals includes information for the IPP or IPPS communication, and acquiring the device information from the first image processing device includes switching from Bluetooth communication to the IPP or IPPS communication.

9. An information processing apparatus to search for an image processing device, the information processing apparatus comprising:
   a processor and a memory coupled to each other and to perform operations including:
   receiving a plurality of Bluetooth signals transmitted respectively from first and second image processing devices,
   displaying a first screen in a case where the plurality of Bluetooth signals is received, wherein the first screen includes first information of the first image processing device without including a device name of the first image processing device and includes second information of the second image processing device without including a device name of the second image processing device,
   identifying the first image processing device corresponding to a highest received signal strength of a received Bluetooth signal, among the first and second image processing devices corresponding to the received plurality of Bluetooth signals,
   requesting the first image processing device to issue a server certificate in a case where the identified first image processing device supports Internet Printing Protocol (IPP) secure version (IPPS) communication,
   acquiring device information from the first image processing device using the IPPS communication in a case where the server certificate acquired based on the request to issue the server certificate is determined to be reliable,
   displaying, based on the acquired device information, a second screen including the device name of the first image processing device and the second information of the second image processing device without including the device name of the second image processing device, and
   displaying a warning screen in a case where the server certificate acquired based on the request to issue the server certificate is determined not to be reliable.

10. A non-transitory computer-readable storage medium storing a program to cause a computer to perform a method for an information processing apparatus to search for an image processing device, the method comprising:
   receiving a plurality of Bluetooth signals transmitted respectively from first and second image processing devices;
   displaying a first screen in a case where the plurality of Bluetooth signals is received, wherein the first screen includes first information of the first image processing device without including a device name of the first image processing device and includes second information of the second image processing device without including a device name of the second image processing device;

identifying the first image processing device corresponding to a highest received signal strength of a received Bluetooth signal, among the first and second image processing devices corresponding to the received plurality of Bluetooth signals;

requesting the first image processing device to issue a server certificate in a case where the identified first image processing device supports Internet Printing Protocol (IPP) secure version (IPPS) communication;

acquiring device information from the first image processing device using the IPPS communication in a case where the server certificate acquired based on the request to issue the server certificate is determined to be reliable;

displaying, based on the acquired device information, a second screen including the device name of the first image processing device and the second information of the second image processing device without including the device name of the second image processing device; and displaying a warning screen in a case where the server certificate acquired based on the request to issue the server certificate is determined not to be reliable.

* * * * *